Oct. 11, 1966  R. F. HIRSCH ET AL  3,278,231
SAFETY BELTS
Filed Sept. 23, 1963
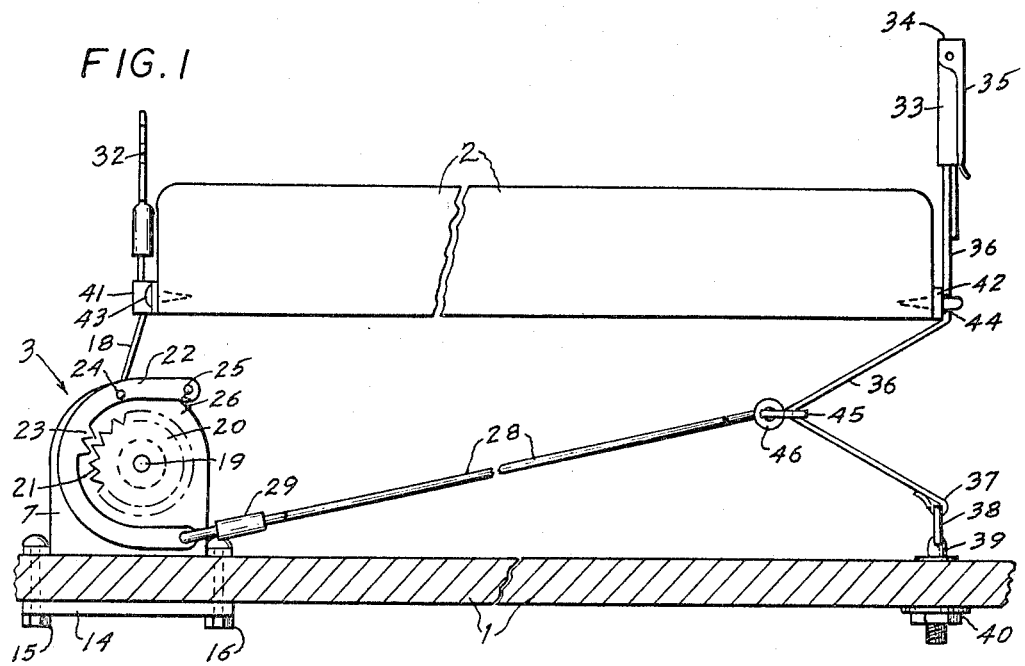
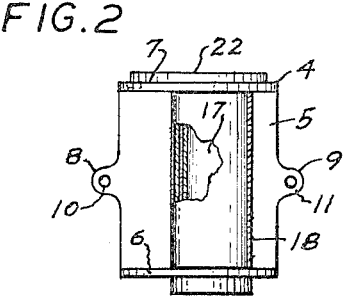
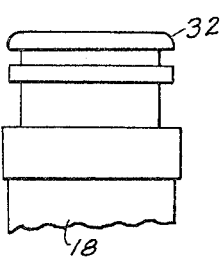
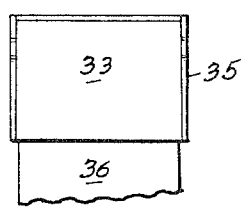
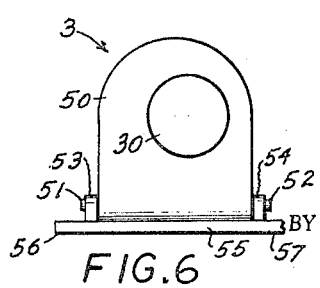
RICHARD F. HIRSCH
AND EARL O. BELL
INVENTORS
BY Earl E. Moore
ATTY.

United States Patent Office 3,278,231
Patented Oct. 11, 1966

3,278,231
SAFETY BELTS
Richard F. Hirsch, 430 Vine St., Glendale, Calif., and Earl O. Bell, 16222 Dubesor, La Puente, Calif.
Filed Sept. 23, 1963, Ser. No. 310,647
7 Claims. (Cl. 297—388)

This invention relates to safety belts and the like which are self-adjusting so that the wearer can depend upon a snug fit of his belt at all times. Safety belts are employed in airplane service and are now becoming general in automobile services. It should be obvious, however, that the belt herein described may be found useful in other adaptations such as baby carriages, amusement devices, operating tables etc.

One of the principal objects of this invention is to provide an adjustable belt suitable for use to hold the wearer onto his chair or seat, table or platform and the like and especially when an accident occurs and this is especially true in accidents involving automobiles, trucks and buses.

Another object is to provide a vehicle seat with an adjustable safety belt that can be quickly and easily placed about the waist of a car occupant and then made snug to hold the occupant in a safe position upon the seat when the car is involved in a serious accident or in the event of a sudden stop.

Other objects and purposes of this invention will become apparent upon a careful reading of the specification, and the claims appended thereto.

In the drawings:

FIG. 1 is a front elevational view of the invention, with parts broken away, showing same in combination with a seat;

FIG. 2 is a plan view, partly in section, showing a portion of the invention;

FIG. 3 is a side elevational view of that shown in FIG. 2, but with a part thereof broken away;

FIG. 4 is an elevational view of a portion of a fastener and a portion of a belt attached thereto;

FIG. 5 is an elevational view of another portion of the fastener and a portion of a belt attached thereto.

FIG. 6 is a side elevational view of a modified form of the invention.

As illustrated, the element 1 is the floor of an automobile and the element 2 is a seat supported by the floor in any suitable manner. The exact manner of supporting the seat is unimportant in that it does not form a novel part of this invention. However, suitable bracket means and the like would be provided for giving subjacent support to the seat.

A retracting means 3 consisting of a yoke-like holder means 4 which has a base plate 5 with integral upstanding ears 6 and 7 and lobes 8 and 9 is shown. The lobes have their respective bolt holes 10 and 11 to accommodate the bolts 12 and 13 which pass through holes in the floor 1. A washer-type plate 14 is provided along with the nuts 15 and 16 for a secure fix or anchoring means.

Between the ears of the retractor means there is a roller 17 upon which are convolutions of a belt 18. This belt 18 may be leather or fabric or any other kind of material suitable for the purposes. The inner end of this belt or strap 18 is firmly secured to the roller in any suitable manner such as by bolts, screws etc. This roller is keyed or fixed to a shaft means 19 that is journalled in the end ears 6 and 7, as shown. One end of this shaft means is keyed to or fixed to a toothed wheel 20 having the teeth 21 which extend around the complete periphery of the wheel. A brake or holding bar means for the wheel is provided by the curved bar 22 which is provided with the integral teeth 23 which are adapted to engage a plurality of teeth on the wheel 20 and thus hold the wheel from turning and hence prevent unwinding of the belt 18. Obviously, these teeth may be of any suitable configuration for holding power purposes. This brake bar 22 is pivoted at 24 and has the end 25 attached to a coiled spring 26, the other end of this spring being attached to an upper portion of the ear 6. The other end 27 of the bar is attached to the flexible cable or wire means 28 through an adjustable sleeve means 29 which is common in the cord and wire art.

Mounted upon and fixed to the ear 6 there is a round covered casing or housing 30 through which an end of the shaft 19 passes and which shaft is far enough in the casing to accommodate the band type coiled spring 31. One end of this spring is fixed to the shaft and its other end fixed to a portion of the casing or the ear 6. By this construction, the roller 17 rotates in one direction under spring action to wind the belt thereon and it rotates in the other direction to release some of the belt as the spring stores up energy during the winding operation. For example, when the belt is pulled, it winds the spring 31 onto the roller shaft and when the belt is released, the spring winds a portion of the belt onto the roller. This action is very similar to the common window shade roller except that the catch means is exterior of the roller and is controlled by a cable means.

The belt 18 has its upper end fixed into the ferrule of a tongue type clasp means 32 which is complementary to and adapted to enter the well known keeper means 33 through an end opening at 34. A spring means in connection with the latch cover 35 grapples and releases the tongue. A belt 36 is fixed in the ferrule of the keeper 33 and extends to a holder loop means 37 to which it is securely fixed. It might be well to state here: that the particular kind of buckle means or clasp means is not important to this invention, hence they may be of any suitable type for releasably holding the belts 18 and 36 together in mutual connection and a secured one. The belt loop holder 37 engages the belt receiver loop means 38 that is integral with a threaded and washered stem 39 which passes through a hole in the floor of the car and is held in place by the nut and washer means 40. For holding the belts in proper handy position, the guide brackets 41 and 42 are provided and fixed to the sides of the seat by the pairs of screws indicated by 43 and 44 as shown. These guide brackets allow the belts to slip easily through their loops so that the belt fasteners can be easily found and brought together and then clasped. A slip loop 45 is provided along the belt 36 and it has a stem 46 to which one end of the cable 28 is firmly fixed.

It should now be obvious, that when a person is seated upon 2, he can easily find the pair of belts and pass them about his waist and then clasp the ends 32 and 33 together. When the belt 36 is slipped through the loop 45 slowly, the teeth 21 and 23 are not meshed because of the tension in spring 26. Pulling the belt 18 causes the drum or roller 17 of the locking means to rotate and store energy in the spring means 31. When the belts are once connected, they remain snug to a person's waist because the roller 17 due to its spring will always take up the slack. When the ends of the belts are thus fastened, the belt 18 then has a steady pull upon the belt 36 and this keeps a steady pull upon the cable 28 and this keeps the device locked, that is, the teeth 21 and 23 in mesh. There is enough slack in the cable 28 and the belt 36 to prevent operation of the bar 22 until the fastener 33 is positioned near the middle portion of the seat 2.

In FIG. 6 is shown a restorer means 3 substantially the same as the other one illustrated in FIG. 3, except that the base does not have the projecting lobes like 8 and 9. Instead of lobes, this form of the invention has the projecting pins 51 and 52 which have bearing relationship with their respective supporting blocks 53 and 54. These blocks are integral with the base plate 55 and this plate has the projecting lobes 56 and 57 through which screws or bolts are passed to firmly hold the plate 55 to a floor or the like of an automobile or airplane. The pins and blocks form a hinge so that the straps or belts can be in good position when the seat or chair 2 is adjusted forwardly or rearwardly. Although hinge means are not necessary to the invention, it is nevertheless a desirable improvement.

Certain novel features and details of this invention are disclosed herein, and in some cases in considerable detail, in order to make the invention clear in at least one form thereof. However, it is to be clearly understood that the invention, as disclosed, is not necessarily limited to the exact form and details disclosed since it is apparent that various modifications and changes may be made without departing from the spirit and scope of the claims of this invention.

Having thus described our invention, what is claimed as new and desired to be secured by Letters Patent is:

1. A safety belt means for seats and the like comprising a seat supported above a floor and having belt means consisting of a first belt portion and a second belt portion, a spring controlled belt retracting roller means, the first belt portion having an end thereof attached to the roller means which is firmly fixed to the floor below one side of the seat, the second belt portion having an end thereof fixed to the floor below an opposite side of the seat, the free ends of the belt portions having complementary fastening means adapted to be secured together when the belt portions are passed about the waist portions of a person's body, a slip loop means on the second belt portion having a cable extending therefrom, teeth extending from said roller means, a locking means having a bar with teeth pivoted near the roller means and which teeth are adapted to engage the teeth extending from the roller means, a spring constantly urging the teeth apart, one end of the bar having connection to the other end of the cable so that when there is a positive pull upon the cable, when the free ends of the belt portions are joined together, the locking means is operated so that the teeth are meshed and the roller means held immovable.

2. The combination set out in claim 1 wherein each belt portion is provided with a fixed slip loop means which are fixed to their respective sides of the seat.

3. The combination set out in claim 1 wherein the mentioned bar is in C-form having an inner curved surface provided with the mentioned teeth thereon.

4. The combination set out in claim 1 wherein the mentioned bar is in C-form having an inner surface provided with a plurality of said teeth intermediate the ends thereof, and the bar having pivot means intermediate the said teeth thereon and one of the ends thereof.

5. The combination set out in claim 1 wherein the fastening means includes a latch lever means which can be quickly and easily released to separate the belt portions from each other.

6. A safety belt means for seats and the like comprising a seat supported above a floor, a slip-loop on each side of the seat, belt means consisting of a first belt portion and a second belt portion, each one of the belt portions passing through its respective slip-loop, a yoke-like holder means fixed to the floor below one side of the seat, the holder means having a spring controlled roller means pivoted thereto and upon which the first mentioned belt portion has an end thereof fixed to the roller means so that the roller can wind same thereon when released; the second belt portion having an end thereof fixed to the floor below the opposite side of the seat, the free ends of the belt portions having complementary fastening means so that they can be secured together when passed about a person's body, a third slip-loop means about the second belt portion and having a cable means extending therefrom toward said holder means, teeth extending from a portion of said roller means, a pivoted bar supported by the holder means and which bar has teeth on one side thereof adapted to engage the teeth on the roller means, spring means constantly urging the teeth apart, one end of the bar having connection with the other end of the cable means, whereby when the second belt portion is pulled so as to pull the cable means, the teeth are meshed and hence the roller means locked.

7. The combination set out in claim 6 wherein the mentioned holder is pivoted for alinement of the belt portion when the seat is shifted to a new position.

References Cited by the Examiner

UNITED STATES PATENTS

| | | | |
|---|---|---|---|
| 2,708,555 | 5/1955 | Heinemann et al. | 297—388 |
| 2,798,539 | 7/1957 | Johnson | 297—388 |
| 2,830,655 | 4/1958 | Lalande | 297—388 |
| 2,963,080 | 12/1960 | Zang | 297—388 |
| 3,020,089 | 2/1962 | Monroe | 297—388 |
| 3,100,669 | 8/1963 | Monroe | 297—388 |
| 3,147,996 | 8/1964 | Ferrara et al. | 297—388 |

FRANK B. SHERRY, *Primary Examiner.*

J. S. PETRIE, R. B. FARLEY, *Assistant Examiners.*